United States Patent
Chazalet et al.

(10) Patent No.: US 11,213,024 B2
(45) Date of Patent: Jan. 4, 2022

(54) INSECT CATCHING DEVICE

(71) Applicant: SCOTTS FRANCE SAS, Ecully (FR)

(72) Inventors: Lionel Chazalet, Saint Germain au Mont d'Or (FR); Noemie Drouot, Oullins (FR); Bruno Leroux, Saint Etienne des Oullieres (FR)

( * ) Notice: Subject to any disclaimer, the term of this patent is extended or adjusted under 35 U.S.C. 154(b) by 587 days.

(21) Appl. No.: 15/767,095

(22) PCT Filed: Oct. 6, 2016

(86) PCT No.: PCT/EP2016/073827
§ 371 (c)(1),
(2) Date: Apr. 9, 2018

(87) PCT Pub. No.: WO2017/060323
PCT Pub. Date: Apr. 13, 2017

(65) Prior Publication Data
US 2018/0295832 A1    Oct. 18, 2018

(30) Foreign Application Priority Data
Oct. 8, 2015   (EP) ..................................... 15306585

(51) Int. Cl.
*A01M 3/04*    (2006.01)
*A01M 1/14*    (2006.01)
*A01M 3/02*    (2006.01)

(52) U.S. Cl.
CPC .............. *A01M 3/022* (2013.01); *A01M 1/14* (2013.01); *A01M 3/04* (2013.01)

(58) Field of Classification Search
CPC .......... A01M 3/04; A01M 3/022; A01M 3/02; A01M 3/00; A01M 1/14; A01M 77/00
(Continued)

(56) References Cited

U.S. PATENT DOCUMENTS

| 382,580 | A | * | 5/1888 | Wilmot et al. | ....... | A01M 3/022 |
| | | | | | | 43/136 |
| 428,277 | A | * | 5/1890 | Jarmuth | ................. | B65D 65/38 |
| | | | | | | 206/447 |

(Continued)

FOREIGN PATENT DOCUMENTS

| CA | 2162930 A1 | * | 12/1997 | .............. | A01M 3/02 |
| DE | 2843106 A1 | * | 4/1980 | ............ | A01M 3/022 |

(Continued)

OTHER PUBLICATIONS

Translation of DE 2843106 (Year: 1980).*

(Continued)

*Primary Examiner* — Darren W Ark
(74) *Attorney, Agent, or Firm* — Ulmer & Berne LLP

(57) ABSTRACT

A device for capturing insects can include a handle and a head fastened to one end of the handle. The head can include a holder intended to contain a pack of adhesive sheets suitable for holding an insect and a frame that matches the holder and has at least one rim intended to cover part of the pack of adhesive sheets. The rim can be configured so as to constitute a predetermined tear-away zone on the pack of adhesive sheets, so that each adhesive sheet from the pack of adhesive sheets can be peeled apart from each other without multiple sheets being removed together. The frame can define a cavity adjacent to one adhesive face of the pack of adhesive sheets so that insects present in the cavity adhere to the adhesive sheet.

17 Claims, 3 Drawing Sheets

(58) Field of Classification Search
USPC .............. 43/136, 137, 134, 114, 115, 12;
15/104.002, 104.001, 143.1, 144.1, 144.2;
206/447; 473/524, 526, 531
See application file for complete search history.

(56) References Cited

U.S. PATENT DOCUMENTS

| | | | | |
|---|---|---|---|---|
| 467,125 A * | 1/1892 | Trenner | G09F 3/10 | 206/447 |
| 783,211 A * | 2/1905 | Maddux | A01M 1/14 | 43/115 |
| 827,006 A * | 7/1906 | Gathmann | A01M 1/14 | 43/115 |
| 979,640 A * | 12/1910 | Boerngen | A01M 3/022 | 43/136 |
| 1,005,443 A * | 10/1911 | Luckett | A01M 3/022 | 43/136 |
| 1,083,179 A * | 12/1913 | Armstrong | A01M 3/022 | 43/136 |
| 1,089,520 A * | 3/1914 | Yokoyama | A01M 1/14 | 43/115 |
| 1,154,310 A * | 9/1915 | Hemenway | A01M 3/022 | 43/136 |
| 1,190,165 A * | 7/1916 | Hemenway et al. | A01M 3/022 | 43/136 |
| 1,391,841 A * | 9/1921 | Lewis | A01K 77/00 | 43/12 |
| 1,604,460 A * | 10/1926 | Marlow | A01M 3/022 | 43/136 |
| 1,718,805 A * | 6/1929 | Wilkie | A01M 3/002 | 43/136 |
| 1,802,774 A * | 4/1931 | Nixon | A01M 1/14 | 43/136 |
| 1,861,378 A * | 5/1932 | Bloodgood | A01M 1/14 | 43/136 |
| 1,861,688 A * | 6/1932 | Crawford | A01M 3/02 | 43/137 |
| 1,888,563 A * | 11/1932 | Nixon | A01M 3/02 | 43/136 |
| 1,972,762 A * | 9/1934 | Drummond | A01M 1/14 | 43/115 |
| 2,053,167 A * | 9/1936 | Schneider | A47L 23/04 | 15/185 |
| 2,189,360 A * | 2/1940 | Haviland | A01M 3/02 | 43/135 |
| 2,384,162 A * | 9/1945 | Finn | A01K 77/00 | 43/12 |
| 2,618,882 A * | 11/1952 | Martin | A01M 3/022 | 43/136 |
| 2,693,610 A * | 11/1954 | Hensley, Jr. | A46B 15/00 | 15/104.002 |
| 2,962,836 A * | 12/1960 | Hughes | A01M 25/004 | 43/58 |
| 3,449,856 A * | 6/1969 | Weaver | A01M 3/022 | 43/136 |
| 4,120,114 A * | 10/1978 | Little | A01M 3/02 | 43/137 |
| 4,126,959 A * | 11/1978 | Graham | A01M 3/022 | 43/136 |
| 4,161,079 A * | 7/1979 | Hill | A01M 23/005 | 43/114 |
| 4,355,720 A * | 10/1982 | Hofberg | B65D 83/08 | 206/447 |
| 4,381,766 A * | 5/1983 | Avolio | A46B 5/0033 | 15/143.1 |
| 4,653,222 A * | 3/1987 | Viscosi | A01M 3/022 | 43/137 |
| 4,713,274 A * | 12/1987 | Minor | A47L 25/005 | 15/104.002 |
| 4,746,119 A * | 5/1988 | Jeanrot | A63B 49/038 | 473/531 |
| 4,759,150 A * | 7/1988 | Pierce | A01M 3/022 | 43/136 |
| 4,787,171 A * | 11/1988 | Dagenais | A01M 3/022 | 43/137 |
| 4,905,408 A * | 3/1990 | Wu | A01M 3/022 | 43/136 |
| 4,907,367 A * | 3/1990 | Herman | A01M 3/02 | 43/137 |
| 4,914,855 A * | 4/1990 | Sherman | A01M 3/022 | 294/212 |
| 5,060,794 A * | 10/1991 | Linn | A44B 15/005 | 206/232 |
| 5,095,648 A * | 3/1992 | Keenan | A01M 1/02 | 43/133 |
| 5,269,092 A * | 12/1993 | Cobble | A01M 3/022 | 43/137 |
| D375,816 S * | 11/1996 | Long-Langworthy | D28/63 | |
| 5,630,290 A * | 5/1997 | Wade | A01M 3/022 | 43/136 |
| 5,692,261 A * | 12/1997 | Lops | A45D 40/26 | 15/185 |
| D408,944 S * | 4/1999 | Petschow | D28/7 | |
| 6,055,767 A * | 5/2000 | Carter | A01M 3/022 | 43/137 |
| 6,957,510 B1 * | 10/2005 | Kominkiewicz | A01M 3/022 | 43/136 |
| D518,597 S * | 4/2006 | Sommers | D24/119 | |
| 7,165,355 B2 * | 1/2007 | George | A01M 3/022 | 43/135 |
| 7,430,830 B1 * | 10/2008 | Rosa | A01M 3/022 | 43/136 |
| 7,721,486 B2 * | 5/2010 | Rosario | A01M 3/022 | 43/136 |
| 8,141,565 B2 * | 3/2012 | Slavin | A45D 34/041 | 132/320 |
| 8,438,686 B2 * | 5/2013 | Morano | A47L 25/005 | 43/136 |
| 8,567,114 B1 * | 10/2013 | Drapeau | A01M 3/04 | 43/136 |
| 8,935,877 B2 * | 1/2015 | Gotschi | A01M 3/04 | 43/136 |
| 9,179,663 B1 * | 11/2015 | Holland | A01M 3/02 | |
| 9,854,794 B1 * | 1/2018 | Hand | A01M 3/022 | |
| D928,408 S * | 8/2021 | Meng | D28/63 | |
| 2004/0256480 A1* | 12/2004 | Channer | A61L 9/048 | 239/34 |
| 2005/0268416 A1* | 12/2005 | Sommers | A47K 7/028 | 15/209.1 |
| 2008/0040967 A1* | 2/2008 | Young | A01M 3/04 | 43/136 |
| 2009/0158636 A1 | 6/2009 | Rosario | | |
| 2010/0229315 A1* | 9/2010 | Rosenzweig | B25G 3/38 | 15/144.1 |
| 2012/0180380 A1* | 7/2012 | Grant, III | A01M 3/04 | 43/136 |
| 2013/0025186 A1* | 1/2013 | Scheubeck | A01M 3/02 | 43/137 |
| 2014/0215738 A1* | 8/2014 | Hagans | B25G 1/04 | 15/144.2 |
| 2014/0352201 A1* | 12/2014 | Wegscheider | A01M 3/022 | 43/137 |
| 2017/0303525 A1* | 10/2017 | Chatman | A01M 3/022 | |
| 2019/0274295 A1* | 9/2019 | Schmidt | A01M 3/04 | |
| 2020/0344993 A1* | 11/2020 | Mawarimoto | A01M 3/022 | |
| 2020/0404899 A1* | 12/2020 | Mawarimoto | A01M 3/022 | |
| 2021/0037805 A1* | 2/2021 | Kim | A01M 1/14 | |

FOREIGN PATENT DOCUMENTS

| | | | |
|---|---|---|---|
| DE | 29603177 U1 * | 7/1996 | ............ A01M 3/022 |
| DE | 202015106160 U1 * | 11/2015 | ............ A01M 3/04 |
| FR | 3027490 A1 | 4/2016 | ............ A01M 3/04 |
| JP | 06209685 A * | 8/1994 | |
| JP | 07099873 A * | 4/1995 | |
| JP | 09275873 A * | 10/1997 | |
| JP | 10191866 A * | 7/1998 | |

(56) References Cited

FOREIGN PATENT DOCUMENTS

| | | | |
|---|---|---|---|
| JP | 2879770 B2 * | 4/1999 | |
| JP | 2000157137 A * | 6/2000 | |
| JP | 2004248646 A * | 9/2004 | |
| JP | 2007135576 A * | 6/2007 | |
| JP | 2008005709 A * | 1/2008 | |
| JP | 2008011836 A * | 1/2008 | |
| JP | 4850598 B2 * | 1/2012 | |
| JP | 2017038544 A * | 2/2017 | |
| KR | 20030093453 A * | 12/2003 | |
| KR | 20030093619 A * | 12/2003 | |
| KR | 20030094920 A * | 12/2003 | |
| KR | 20030094980 A * | 12/2003 | |
| KR | 200463707 Y1 * | 11/2012 | |
| SI | 9300658 A2 * | 8/1995 | |
| WO | WO-0189296 A1 * | 11/2001 | A01M 3/02 |
| WO | WO-2004060060 A2 * | 7/2004 | A01M 3/022 |
| WO | WO-2005013684 A1 * | 2/2005 | A01M 3/025 |
| WO | WO-2010142719 A1 * | 12/2010 | A01M 3/02 |
| WO | WO-2013051739 A1 * | 4/2013 | A01M 3/025 |
| WO | WO-2019142908 A1 * | 7/2019 | A01M 3/04 |

OTHER PUBLICATIONS

Translation of DE 29603177 (Year: 1996).*
Translation of FR 3027490 (Year: 2016).*
Translation of JP 07-99873 (Year: 1995).*
Translation of JP 2008-5709 (Year: 2008).*
Translation of JP 2008-11836 (Year: 2008).*
Search Report and Opinion issued by the European Patent Office received for related European Application No. 15306585.9 dated Apr. 13, 2016 (7 pages).
International Search Report and Written Opinion received for International Application No. PCT/EP2016/073827 dated Jan. 13, 2017 (9 pages).

* cited by examiner

INSECT CATCHING DEVICE

SCOPE OF THE INVENTION

This invention concerns a device for capturing insects intended to capture an insect without crushing it, so as to preserve the integrity of the surface on which the insect is resting. It also encompasses such a device that can be used to capture insects resting on a ceiling.

PRIOR STATE OF THE ART

Using flyswatters and flypaper strips are known techniques for capturing insects. However, flyswatters involve the inconvenience of leaving marks, in particular blood, on the surface where an insect is struck. In addition, flypaper strips are unsightly, due to their prolonged exposure in the room where insect removal is desired.

The invention intends to capture insects without crushing them and using a manual device.

In this regard, document U.S. Pat. No. 2,618,882 describes a device for capturing insects comprising a handle and a head attached to one end of the handle. The head has a cavity, inside of which a cardboard sheet is placed. The cardboard sheet has an adhesive surface such that, when the cavity is placed over an insect, the insect becomes stuck to the cardboard sheet and cannot get loose.

Therefore, the insect is not crushed against the surface on which it is resting, but it is captured by the adhesive surface placed inside the cavity. However, the cardboard surface must be changed once several insects are stuck to it. The process of inserting and removing the cardboard surface is fairly complex and time-consuming for the user.

In addition, document U.S. Pat. No. 7,430,830 describes a flyswatter comprising a handle and a head attached to one end of the handle. The head has a pack of adhesive sheets intended to capture the debris from insects eliminated when the swatter hits a flying insect.

Therefore, the bodies of dead insects are collected on the adhesive sheet after the flyswatter is used. The adhesive sheet can then simply be peeled away from the pack of adhesive sheets and discarded.

The adhesive surface can thus be changed rapidly with this flyswatter. However, the adhesive sheets in the pack of adhesive sheets are stacked on top of each other. Therefore, when an adhesive sheet is peeled off, there is a risk of pulling off several adhesive sheets simultaneously.

The result is that consumption of adhesive sheets is increased due to the risk of pulling off several adhesive sheets simultaneously.

In addition, this flyswatter does not allow an insect to be captured without crushing it. The result is that, if the insect is resting on a surface, the surface on which the insect is resting is soiled by the insect being crushed.

The technical problem that the invention proposes to resolve is therefore to capture an insect without crushing it, while being able to change the capture surface easily.

Another technical problem that this invention intends to solve lies in the possibility of capturing insects resting on a ceiling.

DESCRIPTION OF THE INVENTION

This invention intends to resolve this technical problem through the use of a frame that fits onto a holder on which a pack of adhesive sheets is placed. The frame thus forms a cavity, intended to capture an insect and also holding part of the adhesive sheets in the pack of adhesive sheets.

To this end, the invention concerns a device for capturing insects that comprises:
a handle,
a head mounted on one end of the handle, with the head comprising:
a holder intended to contain a pack of adhesive sheets suitable for securing an insect, and
a frame that matches the holder and has at least one rim intended to cover part of the pack of adhesive sheets.
wherein the rim is configured so as to constitute a predetermined tear-away zone on the pack of adhesive sheets, so that the adhesive sheets can be peeled apart individually from each other without multiple sheets being removed together,
and wherein the frame defines a cavity adjacent to one adhesive face of the pack of adhesive sheets so that insects present in the cavity adhere to the adhesive sheet.

The invention therefore makes it possible to capture insects without crushing them, because only the frame contacts the surface on which the insect is resting. The insect is thus trapped in the cavity formed by the frame and gets stuck to the adhesive surface.

When the adhesive surface is covered with several insects, it can be changed by simply peeling it off from the pack of adhesive sheets. During this peeling off stage, a portion of the sheets in the pack of adhesive sheets is held by the frame, while another portion, and in particular the top adhesive sheet, is removed from the pack of adhesive sheets. The separation of each adhesive sheet occurs in a tear-away zone that is predetermined by the position of the frame.

According to one mode of execution, the frame is mounted so that it can rotate on the holder, with the frame having a latch that comprises a tab that fits into a slot in the holder in order to hold the frame on the holder. When the pack of adhesive sheets contains no more adhesive sheets, it can be replaced by opening the frame latch and rotating the frame with respect to the holder so that the used pack can be removed. A new pack of adhesive sheets can then be placed on the holder. The frame is then reclosed over this new pack of adhesive sheets.

According to one mode of execution, the holder has at least one peg, and preferably at least four pegs, extending perpendicularly to the surface of the holder and positioned so as to be covered by the rim when the frame is fastened to the holder. This mode of execution allows the pack of adhesive sheets to be held in position when it is inserted.

According to one mode of execution, the pegs are positioned and/or shaped so that the holder can correct the positioning of the pack of adhesive sheets. This mode of execution allows for mechanical correction to ensure that the pack of adhesive sheets is correctly positioned in the holder, and in particular that the adhesive face is properly placed with respect to the cavity.

According to one mode of execution, the holder is concave, convex, circular, and/or parallelepipedal in shape. The holder supports the back of the pack of adhesive sheets.

According to one mode of execution, a raised edge on the holder and/or frame has a lowered area intended to allow a tab from the sheets in the pack of adhesive sheets to extend out of the cavity. This mode of execution allows one sheet to be peeled easily away from the pack of adhesive sheets using an extension with an adhesive surface provided for this purpose.

According to one mode of execution, the head is attached so that it can rotate on one end of the handle, with the head able to be moved between two positions:
- a vertical position in which a peg on the head locks the head on the handle, and
- a horizontal position in which a peg on the handle locks the head on the handle. This mode of execution allows insects to be captured on the ceiling as well as on the walls.

According to one mode of execution, the head has a face, opposite the cavity, that has at least one rigid surface suitable for striking a flying insect hard enough to destroy it. This mode of execution allows the device to be used as a standard flyswatter.

According to one mode of execution, the handle has an upper part and a lower part that are connected by a pivoting linkage, with locking means that keep the upper and lower parts aligned. This mode of execution allows the device to be folded up when not in use.

DESCRIPTION OF THE FIGURES

The manner of executing the invention, as well as the advantages derived from it, will be evident in the indicative but not limiting mode of execution shown below, with respect to the attached figures, in which

FIG. 1: a perspective view of a device for capturing insects according to one mode of execution of the invention, with a head in vertical position and an unfolded handle;

FIG. 2: a perspective view of the device from FIG. 1 with a head in horizontal position and a folded handle;

FIG. 3: a perspective view of the device from FIG. 2 without the frame and without the lower portion of the handle;

FIG. 4: a downward perspective view of the device from FIG. 1 with a pack of adhesive sheets loaded onto it;

FIG. 5: a perspective view from above of the device from FIG. 1 with a pack of adhesive sheets loaded onto it; and FIG. 6: a perspective view from the side of the head of the device from FIG. 1 with a pack of adhesive sheets loaded onto it.

INVENTION EXECUTION EXAMPLES

Figure 1:
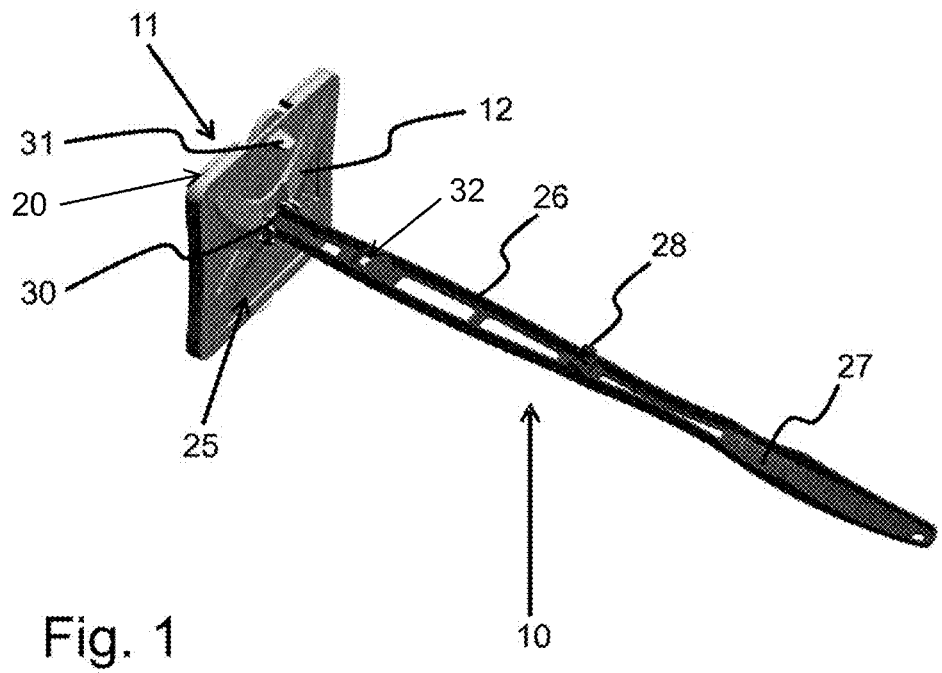
FIGS. 1 to 6 represent.

FIG. 1 illustrates a device for capturing insects comprising a handle 10 and a head 11 attached to one end of the handle 10. The head 11 is intended to contain a pack of adhesive sheets 17, wherein each sheet has an adhesive surface suitable for holding an insect.

The handle 10 has a lower part 27 and an upper part 26 that are connected by a pivoting linkage 28. The lower part 27 has an ergonomic shape allowing a user to wield the device. Both parts 26, 27 have a U-shaped section, with a rim between 1 and 5 millimeters thick. The handle 10 is preferably made of plastic, such as injected polypropylene, for example, so that the device is lightweight and mechanically sturdy. In addition, there are hollowed-out areas along the length of the handle 10, to reduce the weight of the handle 10 and also ensure a good flexibility/rigidity compromise.

The handle 10 can adopt two positions:
- an unfolded position (FIG. 1) in which the length of the lower portion 27 is aligned with the length of the upper portion 26; and
- a folded position (FIG. 2) in which the lower portion 27 extends along the upper portion 26.

As a variation, the handle 10 can be made as a single piece and of other materials without deviating from the concept of this invention. In addition, the parts of the handle 10 can be disassembled.

Figure 2:
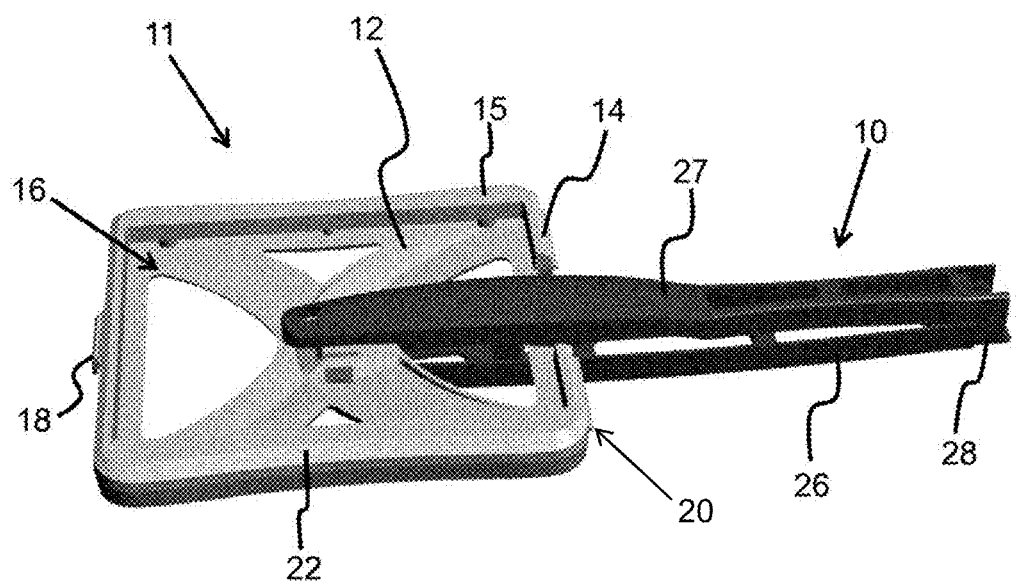

The upper end of the upper portion 26 has a pivot linkage connected to the head 11. More precisely, the head 11 has a holder 12 connected to the upper portion 26 of the handle 10, and a frame 14 fastened to the holder 12. The head 11 can be fastened in two positions: a vertical position (FIG. 1) and a horizontal position (FIG. 2).

In the vertical position, the holder 12 on the head 11 extends perpendicularly to the upper portion 26 of the handle 10. This position is maintained by a peg 30 on the handle 10 that extends perpendicularly with respect to the upper portion 26 of the handle 10. This peg 30 is intended to match up with a strip on the holder 12 at the level of the pivoting linkage between the holder 12 and the handle 10.

In the horizontal position, the holder 12 on the head 11 extends parallel to the upper portion 26 of the handle 10. This position is maintained by a peg 31 located on a back face 25 of the head 11, with the peg 31 extending perpendicularly to the holder 12. This peg 31 is intended to match up with an opening 32 in the upper portion 26 of the handle 10.

FIG. 1 also illustrates the fact that, according to one mode of execution, the holder 12 has a rigid surface created by two overlapping semi-circles. This rigid surface allows the device both to strike flying insects like a standard flyswatter and also to hold a pack of adhesive sheets 13. As a variation, the holder may be concave, convex, circular, and/or parallelepipedal in shape.

Figure 3:
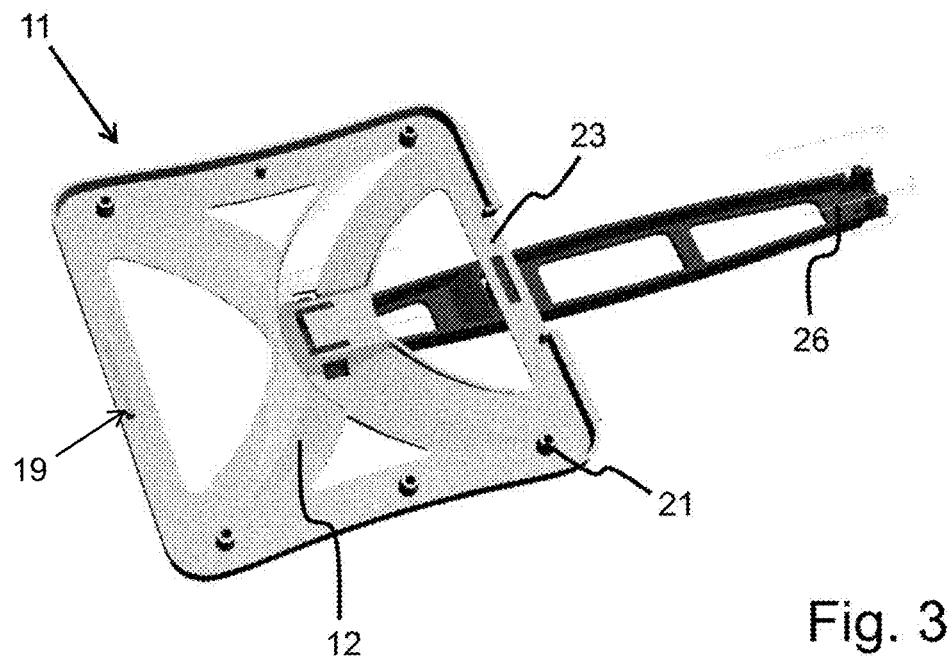
Figure 4:
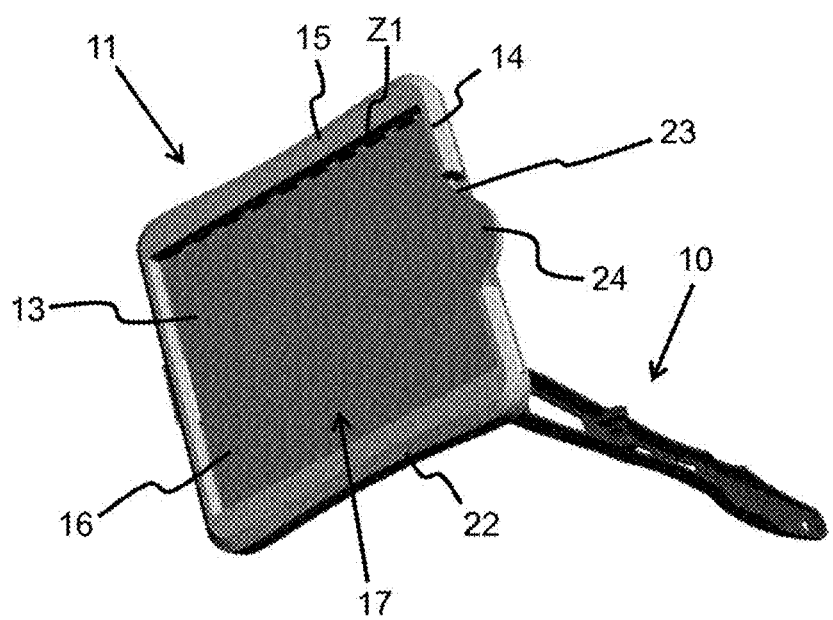
Figure 5:
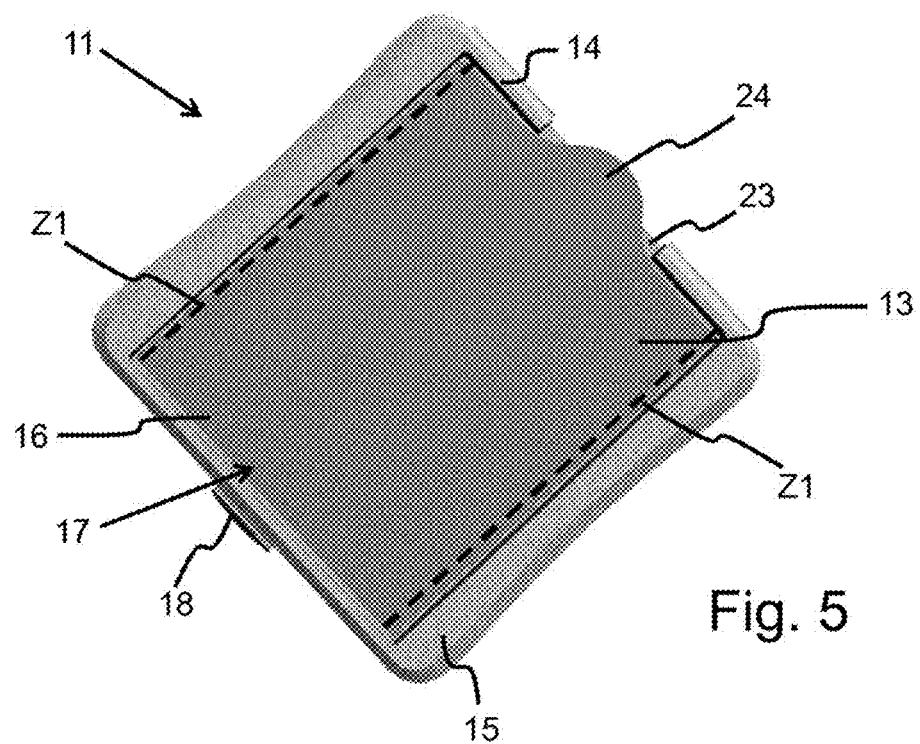
Figure 6:
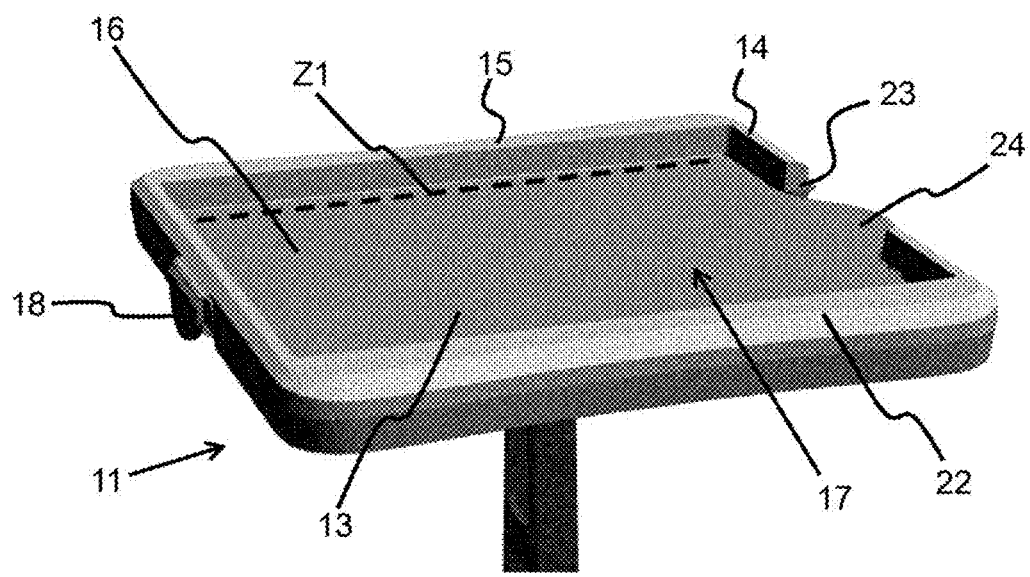

FIG. 3 illustrates the presence of pegs 21 on the holder 12. These pegs are intended to match up with boreholes located on a pack of adhesive sheets 13. For this purpose, the pegs 21 have a cylindrical shape, extending perpendicularly to the surface of the holder 12. As a variation, the pegs 21 can have any other known shape, such as being pointed at the tip. As a variation, the pack of adhesive sheets 13 can be clipped and/or fastened and/or slid into the head 11.

Means of preventing incorrect positioning are also created by the position and/or shape of the pegs 21. For example, FIG. 3 shows one peg 21 whose diameter is much smaller than the others. Here, the pack of adhesive sheets 13 has a borehole whose diameter is adapted to that peg 21, forcing the user to position the pack of adhesive sheets 13 correctly. As a variation, at least two pegs 21 are placed asymmetrically with respect to an axis that passes through the center of the holder 12.

When the pack of adhesive sheets 13 is placed on the holder 12 and engaged with the pegs 21, a frame 14 comes and covers at least one edge of the pack of adhesive sheets 13. The central area of the frame 14 is parallelepipedal in shape. The frame 14 is connected to the holder 12 by two tabs 20 whose thickness allows the frame 14 to be rotated with respect to the holder 12, performing the function of an articulated hinge. For attaching the frame 14 to the holder 12, the frame 14 has a latch 18 comprising a tab that fits into a slot 19 in the holder 12.

The frame 14 has at least one rim 15 having raised edges 22, so that the central well of the frame 14 forms a cavity 16 placed over the pack of adhesive sheets 13. The cavity 16 is parallelepipedal in shape. The height of the edges 22 is predetermined such that the depth of the cavity 16 is adequate for the size of an insect. Thus, when an insect is trapped in the cavity 16, it becomes stuck on an adhesive surface 17 of the pack of adhesive sheets 13, but is not crushed.

The raised edges 22 have a lowered area 23 intended to allow a tab 24 from the sheets in the pack of adhesive sheets 13 to extend out of the cavity 16. Preferably, the tabs 24 have no adhesive, so that gripping the tab 24 is easier for the user.

The head 11 is preferably made of plastic, such as injected polypropylene, for example, so that the device is lightweight and easy to handle.

The frame 14 should be as thin as possible, so that the surface of the cavity 16 is as large as possible. However, at least one rim 15 of the frame 14 is larger so that it can cover at least part of the pack of adhesive sheets 13.

The rim 15 is able to hold the pack of adhesive sheets 13 in the frame 14, in particular when one sheet from the pack of adhesive sheets 13 is removed from the pack of adhesive sheets 13.

For this purpose, and according to one mode of executing the invention, each sheet in the pack of adhesive sheets 13 has a predetermined tear-away zone Z1 that runs along the rim 15.

When a sheet is removed from the pack of adhesive sheets 13 by pulling on the tab 24, part of the sheet lying under the rim 15 remains in the head 11, while another part of the sheet is removed. This predetermined tear-away zone Z1 allows the adhesive sheets to be peeled apart from each other without multiple sheets being removed together.

Preferably, the frame 14 has two edges covering the pegs 21 when the frame 14 is fastened onto the holder 12.

The invention claimed is:

1. A device for capturing insects, comprising:
    a handle, the handle having an upper part and a lower part that are pivotally connected, the handle movable between an unfolded position and a folded position, wherein, in the folded position, the lower part extends along at least a portion of the upper part, and
    a head rotatably fastened to one end of the handle, the head comprising:
        a holder intended to contain a pack of adhesive sheets suitable for holding an insect, and
        a frame that matches the holder and has at least one rim intended to cover part of the pack of adhesive sheets,
    wherein the at least one rim is configured so as to constitute a predetermined tear-away zone on the pack of adhesive sheets, so that each adhesive sheet from the pack of adhesive sheets can be peeled apart individually from each other without multiple sheets of the pack of adhesive sheets being removed together,
    wherein the frame forms a cavity adjacent to one adhesive face of one adhesive sheet of the pack of adhesive sheets so that insects present in the cavity adhere to the one adhesive sheet,
    wherein the frame is attached to the holder so as to rotate on the holder, wherein the frame has a latch comprising a tab that fits into a slot extending through a portion of the holder so as to hold the frame on the holder.

2. The device for capturing insects as in claim 1, wherein the holder has at least one peg extending perpendicularly to a surface of the holder and positioned so as to be covered by the at least one rim when the frame is fastened to the holder.

3. The device for capturing insects as in claim 2, wherein the at least one peg is positioned and/or shaped so as to correct a positioning of the pack of adhesive sheets.

4. The device for capturing insects as in claim 2, wherein the at least one peg comprises four pegs.

5. The device for capturing insects as in claim 1, wherein the at least one rim includes a raised edge having a lowered area intended to allow a sheet tab extending from each adhesive sheet of the pack of adhesive sheets to extend out of the cavity.

6. The device for capturing insects as in claim 5, wherein the sheet tab extending from each adhesive sheet of the pack of adhesive sheets extends out of the head.

7. The device for capturing insects as in claim 1, wherein the head has a face opposite the cavity, that has at least one rigid surface suitable for striking a flying insect hard enough to destroy it.

8. The device for capturing insects as in claim 1, wherein the head is fastened to the one end of the handle at a central portion of the head.

9. The device for capturing insects as in claim 1, wherein the head is fastened to the one end of the handle by a pivot linkage at a central portion of the head.

10. The device for capturing insects as in claim 1, wherein the head is fastened to the one end of the handle by a pivot linkage at a central portion of a back surface of the holder.

11. The device for capturing insects as in claim 10, wherein the head further comprises a peg to lock the head on the handle when the head is in the horizontal position.

12. The device for capturing insects as in claim 1, wherein the head is in a horizontal position in which the holder extends parallel to the upper part of the handle.

13. The device for capturing insects as in claim 1, wherein the head is in a vertical position in which the holder extends perpendicularly to the upper part of the handle.

14. The device for capturing insects as in claim 1, wherein the frame is attached to the holder by being pivotally connected to the holder by an articulated hinge.

15. The device for capturing insects as in claim 1, wherein the frame is attached to the holder by being pivotally connected to the holder by at least one other tab.

16. The device for capturing insects as in claim 1, wherein an outer edge of the holder and an outer edge of the frame cooperate to define an outer edge of the head.

17. The device for capturing insects as in claim 1, wherein, in the folded position, the lower part of the handle partially extends over a portion of the cavity of the head.

* * * * *